Aug. 4, 1959 T. P. HANSON 2,897,858
DEBARKING-DRUM CONSTRUCTION
Filed March 17, 1958 3 Sheets-Sheet 1

Inventor
THOMAS PAUL HANSON
By Alan Aussberg
Attorney

Aug. 4, 1959 T. P. HANSON 2,897,858
DEBARKING-DRUM CONSTRUCTION
Filed March 17, 1958 3 Sheets-Sheet 2
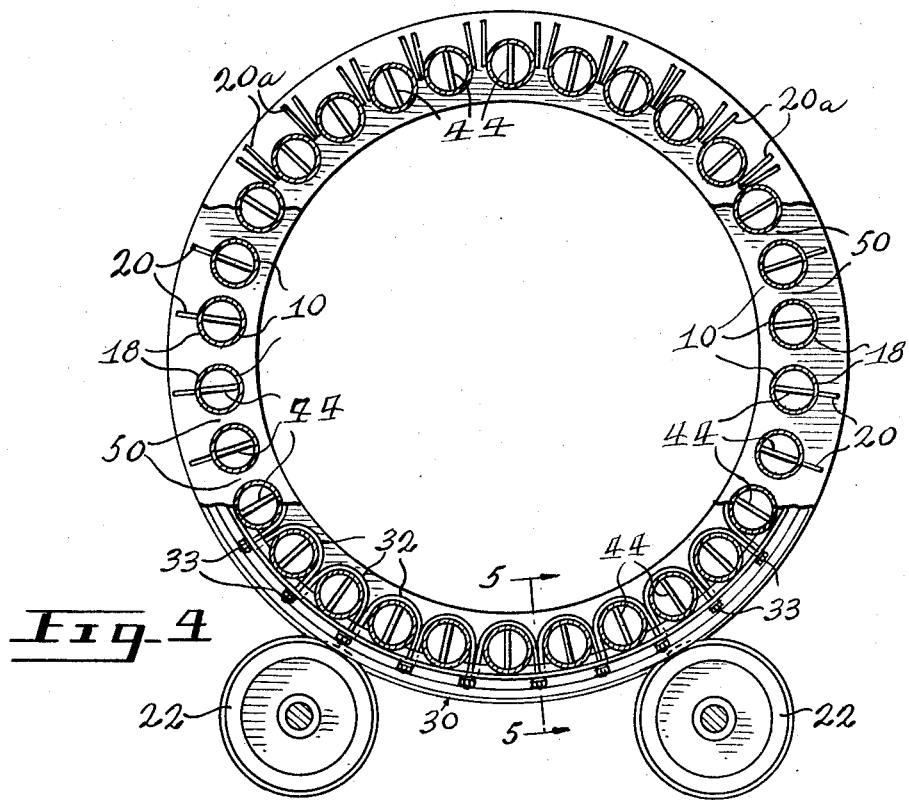
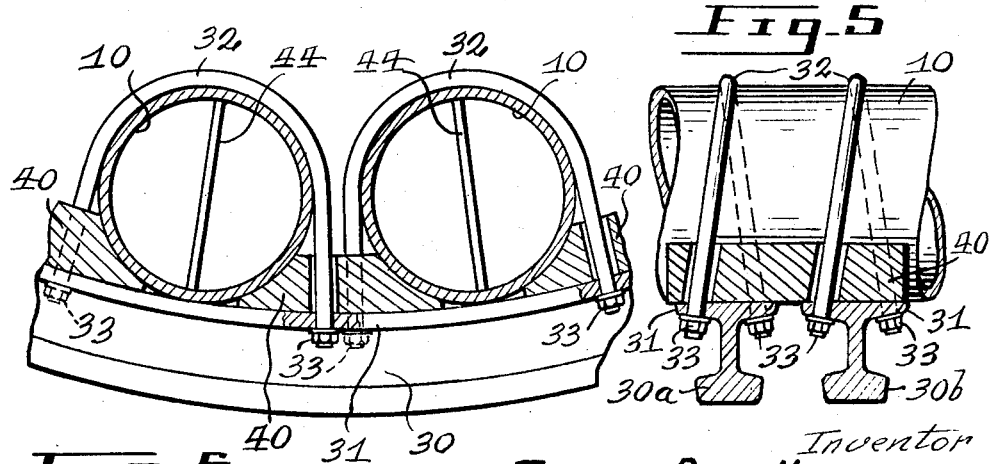
Inventor
THOMAS PAUL HANSON
Attorney

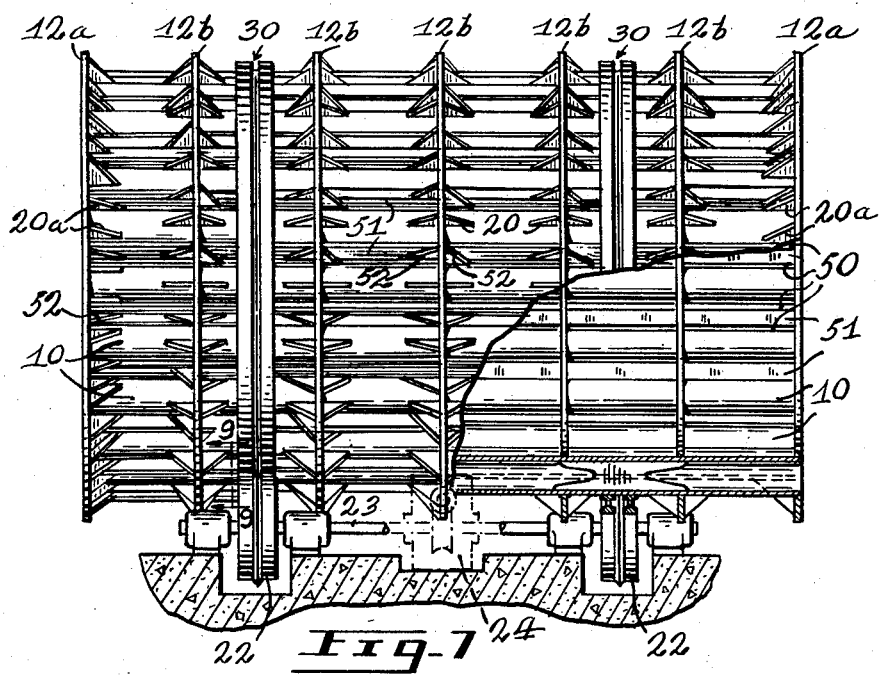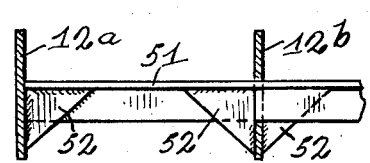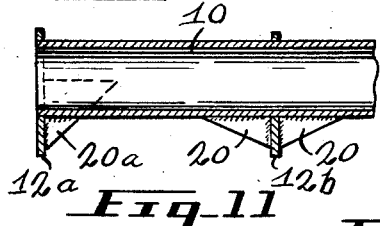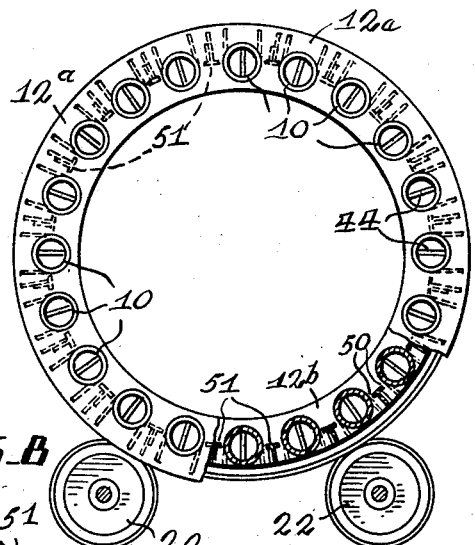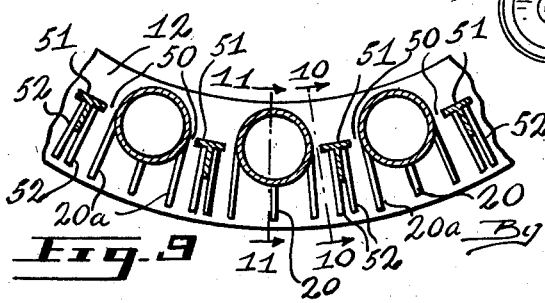

United States Patent Office 2,897,858
Patented Aug. 4, 1959

2,897,858

DEBARKING-DRUM CONSTRUCTION

Thomas Paul Hanson, Lennoxville, Quebec, Canada

Application March 17, 1958, Serial No. 721,909

12 Claims. (Cl. 144—208)

The present invention relates to improvements in the construction of log-barking drums.

As is well known, barking drums in general consist essentially of a large cylindrical drum mounted for rotation on supporting trunnions, chains or the like. The pulpwood sticks or logs are fed into one end of such a drum and are tumbled against each other and the interior of the drum by the rotation of the drum so that their bark is loosened and knocked off as they proceed to the other and discharge end of the drum. The side walls of the drum are perforated or slotted so that the dislodged bark can fall out of the drum and the tumbling or barking operation is usually carried out with water supplied to at least a portion of the drum. It is also known that in order to obtain the maximum efficiency from practically any type of barking drum it should be run at least half full of wood. Since these drums are relatively large structures, i.e. on the order of from about 8 to about 12 feet in diameter and from about 30 to 45 feet in length, it will be obvious that the strains and shocks applied to a barking drum in operation are considerable and that the construction of these drums of necessity must be sufficiently rigid and strong to withstand such shocks for long periods of time without structural failure.

The present invention attempts to achieve, by better distribution of material, a stronger, stiffer structure both in torsion and bending, than is available in contemporary designs.

By utilizing longitudinal members of circular cross section, the highest possible moment of inertia and section modulus is assured on every axis for a given size and material thickness, as compared with the U, V and W shapes in comon use, which have a high section modulus on one axis only.

Normal practice in drum-type debarker construction is to attach the longitudinal members to circumferential hoop or ring members, usually consisting of flat plates rolled into circular shape, with the width of the plate in the direction of the drum axis. This type of construction is relatively weak under stresses tending to deform it from the circular. This weakness is overcome in this design by arranging the circumferential members on edge radially, thus presenting a very high moment of inertia to resist such stresses.

In accordance with the invention, the longitudinal members are continuous for the length of the drum, and are passed through holes in the radial plates. To increase the bearing area, the longitudinal members are attached to the radial plates by gusset plates or brackets, which also support and reinforce the longitudinal members at a location, which, under load, is a highly stressed area.

In operation, any type of longitudinal member in a drum-type debarker, has a tendency to become flattened under the impact of the tumbling load. To overcome this problem, this design utilizes internal stiffening pieces inserted inside the circular longitudinal members in a position vertical to the direction of the impact. These stiffeners are shaped to provide a progressive decreasing of impact resistance towards the ends, so as to avoid an abrupt change in sectional area and modulus, such as would normally present an area of high stress concentration under impact.

A drum construction in accordance with the present invention can be suspended on chains, belts, or cables, or fitted with tires and supported by trunnion rollers. By attaching a ring gear, or a ring sprocket, it can be rotated by pinion, or chain drive, or rotated by friction drive through the supporting trunnion wheels.

A further feature of the present construction is the benefit of much longer bark-disposal openings. These are limited as to allowable width on any type of drum debarker by the minimum diameter of the wood load. The openings are usually restricted lengthways by the use of wide circumferential plates, but by the adoption of radial plates the present construction provides the maximum bark-disposal slot length.

Having thus generally described the nature of the invention, particular reference will be made to the accompanying drawings showing by way of illustration preferred embodiments thereof, and in which:

Figure 4 is a somewhat-enlarged end view in section corresponding to the line 4—4 of Figure 3 to illustrate in more detail the relative positions of the longitudinal members, guide rails and internal and external reinforcing plates.

Figure 5 is an enlarged detail view partially in section of Figure 4 along the line 5—5 to illustrate more clearly the preferred means of attaching the guide rails to the drum framework.

Figure 6 is an end view of the section shown in Figure 5 to show the pillow blocks and U-shaped attachment bolts for securing the guide rails more clearly.

Figure 7 is a view in side elevation, corresponding to Figure 1, of an alternative drum construction in accordance with the invention wherein fewer longitudinal members of circular cross section are utilized, longitudinal angle section being provided between the increased spaces therebetween.

Figure 8 is an end view partially in section of the construction shown in Figure 7 to illustrate the construction more clearly.

Figure 9 is an enlarged sectional view of a portion of Figure 7 along the line 9—9 to illustrate the relative positions of circularly cross sectional longitudinal members and angular members more clearly.

Figure 10 is a cross sectional view along the line 10—10 of Figure 9.

Figure 11 is a cross-sectional view along the line 11—11 of Figure 9.

Figure 1:
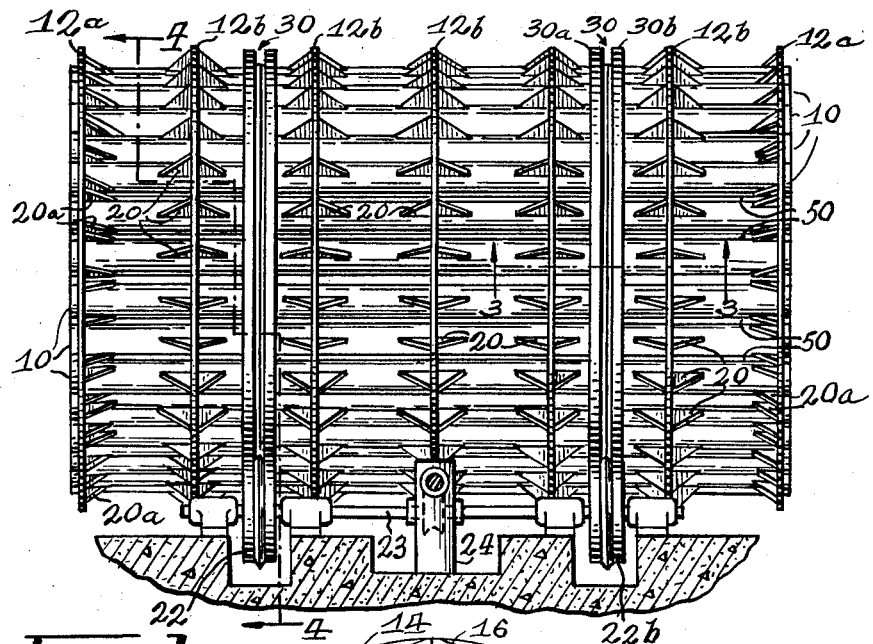
Figure 1 is a view in side elevation of a barking drum constructed in accordance with the invention and driven by a direct drive from the supporting trunnions.
Figure 2:
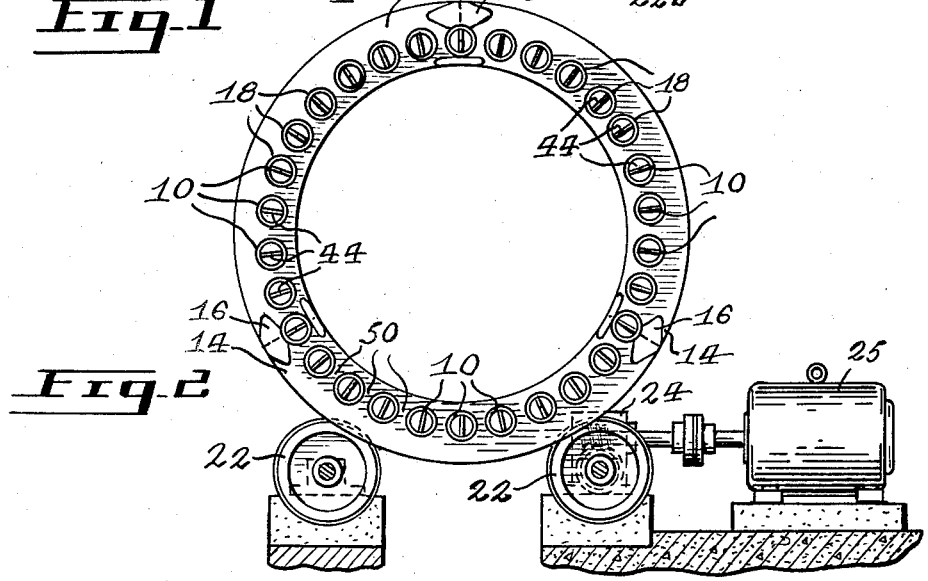
Figure 2 is an end view of the construction shown in Figure 1.

With particular reference to Figures 1 and 2, a barking drum constructed in accordance with the invention includes a plurality of longitudinal members 10 of circular cross section which are mounted in and supported by a plurality of axially spaced annular plates or supporting rings 12 so as to form a cylindrical framework constituting the barking drum. Preferably, and as shown, the longitudinal members 10 are constituted by continuous lengths of extra heavy-gauge steel pipe while the plates or rings 12 comprise arcuate segments 14 of steel plate which are welded together as indicated in Figure 2 with suitable reinforcing gussets 16 as shown.

The annular plates 12 are each provided with regularly and circumferentially spaced openings 18, formed for example by flame cutting with a template, and the longitudinal members 10 are fitted through these openings of the plates 12 at each intersection thereof. To secure the members 10 in position and to increase the bearing area, gusset plates 20 are provided at each side of each supporting ring 12b apart from the end or header rings 12a which are provided with double gusset plates 20a on the inner side only as shown. The gusset plates 20 are aligned along the axis of each longitudinal member 10 and are welded thereto and to the rings 12; while the plates 20a are located at and welded to each side of the ends of each member 10 and also are welded to the rings 12a to support and reinforce the members 10 at locations which under load are highly stressed areas.

While it will be understood that the present barking-drum construction may be supported and driven by any of the usual drum-driving arrangements, for example chains, or sprocket-and-chain drives, for the purposes of showing a preferred drive the construction illustrated is shown as being supported for rotation between spaced pairs of trunnions or double-flanged wheels 22, 22b, which are driven by a common shaft 23 extending from a worm and gear transmission 24 driven by a suitable motor 25. In order to supported and guide the drum at the point of contact with the driving wheels 22, guide rails or tires 30 are provided adjacent each end. The tires 30 illustrated are each made up of two sections 30a, 30b of heavy-gauge track rolled to the desired annular formation and secured to the longitudinal members 10 at each intersection by U-bolts 32, as shown most clearly in Figures 5 and 6. At these points and to most effectively retain the members 10, pillow blocks 40 are provided between the tires 30 and the adjacent portions of the members 10, the U-bolts 32 passing through the blocks 40 and the flanges 31 of the track portions making up the tires 30 where they are retained by suitable nuts 33.

As also previously mentioned, any type of longitudinal member has a tendency to become deformed or flattened under the impact of the tumbling load particularly at the points of support or location of the tires 30.

Figure 3:
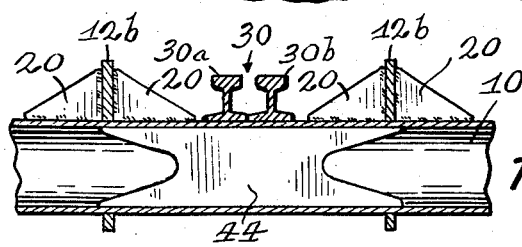
Figure 3 is an enlarged-scale cross-sectional view of the construction shown in Figure 1 along the line 3—3 to illustrate an internal reinforcing plate within a longitudinal member at the point of intersection with one of the guiding rails, the guide rails being shown merely for illustration as to their location relative to the reinforcing plate and adjacent supporting annular plates.

To overcome this problem the construction illustrated utilizes internal stiffening plates 44 inserted in each member 10 in a position vertical to the direction of impact. As shown most clearly in Figure 3, these plates 44 are shaped to provide a progressive decrease of impact resistance towards the ends to avoid an abrupt change in sectional area and modulus, such as would normally present an area of high stress concentration under impact.

As will be appreciated by reference to the accompanying drawings and particularly Figures 1 and 2, the circumferential spacing of the longitudinal members 10 is such that the intervening spaces provide bark-disposal openings 50 which are necessarily limited, as on any type of barking drum, by the minimum diameter of the wood load. However, by the use of the "on edge" or radial supporting rings 12, the length of the bark-disposal openings 50 is substantially the full length of the drum permitting maximum bark discharge.

The alternative, preferred drum construction shown in Figures 7 through 11 is the same as that previously described with the exception that fewer longitudinal members 10 are utilized, the increased intervening spaces being partially blocked by substantially T-shaped longitudinal sections 51 fitting between the supporting rings 12. The sections 51 are reinforced by gusset plates 52 disposed at each side and welded to the respective opposed surfaces of the rings 12 as shown in Figures 9 and 10. This alternative construction provides a more irregular or corrugated inner surface to the drum, aiding the tumbling action.

While the illustrated drum constructions are of the single-section type it will be obvious that the dimensions can be altered without change to the form of construction. For example, one or more additional sections could be added to increase the length of the drum, each being provided with its own tires and supporting trunnions.

I claim:

1. A barking drum comprising a cylindrical framework made up of a plurality of axially spaced plates of annular formation disposed on edge radially, each of said plates containing a corresponding plurality of regularly and circumferentially spaced openings extending therethrough, a plurality of elongated members of constant, circular cross section supported by and extending longitudinally between said plates in cylindrical formation with each of said members fitting through one aligned row of said openings in said plates, and connecting means securing said members to said plates at each intersection therewith.

2. A barking drum, as claimed in claim 1, wherein said connecting means comprises opposed pairs of reinforcing gusset plates disposed at each intersection of said longitudinal members and said plates, said gusset plates being positioned in axial alignment with said longitudinal members and welded to said members and annular plates.

3. A barking drum, as claimed in claim 1, wherein each of said longitudinal members is provided with spaced internal reinforcing plates disposed transaxially of said circular cross section and in radial alignment with the axis of said cylindrical framework.

4. A barking drum, as claimed in claim 1, including a plurality of longitudinal members of substantially T-shaped formation in cross section disposed in alternate relationship between said longitudinal members of circular cross section, and means connecting said T-shaped members to each of said annular plates.

5. A barking drum including a cylindrical framework made up of a plurality of axially spaced flat plates of annular formation, each of said plates containing a plurality of regularly and circumferentially spaced openings, and a plurality of lengths of heavy-gauge metal pipe supported by and extending longitudinally between said annular plates with each of said pipe lengths extending through one aligned row of said annular plate openings, and means securing said pipes and plates to each other at each intersection thereof.

6. A barking drum, as claimed in claim 5, wherein said connecting means comprises opposed pairs of reinforcing gusset plates disposed at each intersection between said pipes and said plates and welded thereto.

7. A barking drum, as claimed in claim 5, including a plurality of longitudinal members of substantially T-shaped formation in cross section disposed in alternate relationship between said longitudinal pipe lengths, and means connecting said T-shaped members to each of said annular plates.

8. A barking drum comprising in combination, a plurality of axially spaced peripheral rings, a plurality of longitudinal members of generally circular cross section mounted in and extending between said rings in circumferentially spaced cylindrical formation to form therewith an open-ended cylindrical framework, each of said peripheral rings being made up of flat metal plate and having a thickness in the axial direction of said drum considerably less than its transaxial width at any point, reinforcing means connecting said longitudinal members and rings at each intersection therewith, and drum-guiding members mounted on and surrounding said cylindrical framework at spaced points between said peripheral rings.

9. A barking drum, as claimed in claim 8, wherein said longitudinal members each comprise a continuous length of heavy-gauge metal pipe.

10. A barking drum, as claimed in claim 8, wherein said reinforcing means connecting said longitudinal members and rings comprise gusset plates disposed in opposed pairs at each intersection of said members and rings and welded thereto.

11. A barking drum, as claimed in claim 8, wherein each of said longitudinal members is provided with internal reinforcing plates extending transaxially within said member at at least the points intersected by said drum-guiding members.

12. A barking drum, as claimed in claim 8, including a plurality of longitudinal members of substantially T-shaped formation in cross section disposed in alternate relationship between said longitudinal members of circular cross section, and reinforcing gusset plates disposed in opposed pairs adjacent the intersection of each of said T-shaped members and rings and being welded to said members and rings at said intersections.

References Cited in the file of this patent

UNITED STATES PATENTS

| | | |
|---|---|---|
| 2,456,365 | Branch | Dec. 14, 1948 |
| 2,712,330 | Thompson | July 5, 1955 |

FOREIGN PATENTS

| | | |
|---|---|---|
| 50,649 | Norway | Apr. 18, 1932 |